UNITED STATES PATENT OFFICE.

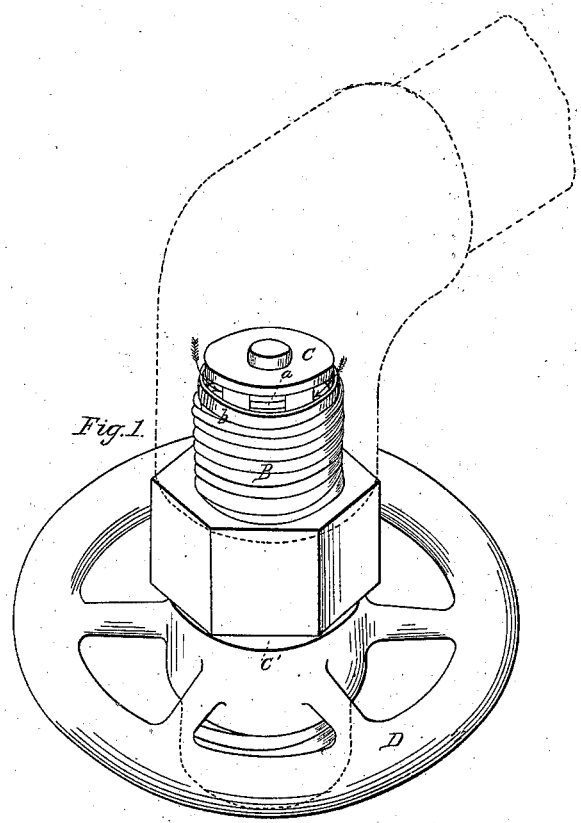
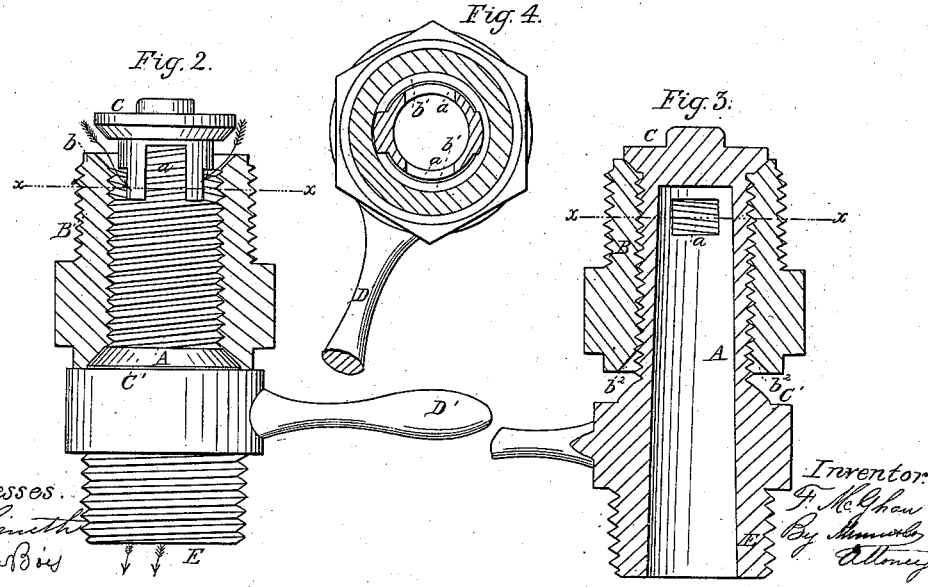

FRANCIS McGHAN, OF WASHINGTON, DISTRICT OF COLUMBIA.

IMPROVEMENT IN STOP-VALVES

Specification forming part of Letters Patent No. 43,218, dated June 21, 1864.

*To all whom it may concern:*

Be it known that I, FRANCIS MCGHAN, of the city and county of Washington, in the District of Columbia, have invented a new and Improved Draw Cock or Valve; and I do hereby declare the following to be a full and exact description of the same, reference being had to the accompanying drawings, making part of this specification, in which—

Figure 1 is a perspective view, on an enlarged scale, of my improved draw cock or valve, the drawings also illustrating the application of a hand-wheel to facilitate the operation. Fig 2 is a sectional elevation representing the valve in an open condition. Fig. 3 is a vertical central section. Fig. 4 is a horizontal section in the line $xx$, Figs. 2 and 3.

Similar letters of reference indicate corresponding parts in the several figures.

The object of this invention is to produce a novel and simple device, both of cheap and durable construction, whereby pipes or other water-passages may be opened and closed with great facility, and which at the same time will effectually prevent leakage, without the interposition of stuffing-boxes, packing-rings, or other similar devices, as will be explained.

In order that others skilled in the art to which my invention appertains may be enabled to fully understand and use the same, I will proceed to describe its construction and operation.

In the accompanying drawings, A may represent a hollow stem or pipe, the periphery of which is threaded or formed like a screw, to adapt it to move or fit within a shell or pipe, B, which is threaded on its interior in corresponding manner.

C represents a beveled valve or cap securely affixed to the end of the stem A, and adapted to rest upon or within a seat, $b$, in the end of the pipe B, and thereby shuts off communication with the water pipe or passage into which the pipe B may be screwed.

The red lines in the drawings indicate the coupling or elbow of a water-pipe as employed in connection with my improved valve. The shell B retains a rigid position when it is inserted into the water-pipe; but by turning a wheel, D, or handle, D', the stem A may be caused to assume such a position that the valve will be elevated completely off or out of its seat $b$.

$a\ a$ represent apertures formed in the stem A in suitable proximity with the valve C, so that when the latter is moved from its seat, in the manner described, the water may pass through the openings $a\ a$ into the hollow stem A, whence it will pass off at the egress-port E. Suitable water-spaces, $b'\ b'$, are left between the exterior of the stem A and interior of the pipe B, to allow the water free access to the openings $a\ a$ when the valve is elevated.

At the junction of the stem A and egress-port E is a beveled annular valve, C', which rises simultaneously with the stem A and valve C' and fits snugly within a corresponding beveled seat, $b^2$, in the end of the shell B. The object of this secondary valve will be apparent. If the valve be employed in connection with hose or in any other water-passage where the water presses with great force, a portion of the liquid would probably work its way between the threads which serve to couple together the stem A and shell B, inasmuch as the joint between these two parts must be devoid of tightness to a certain degree, in order to adapt the stem A to be freely turned so as to operate the valve C; hence the valve C' is employed to prevent any water which may pass between the exterior of the stem A and interior of the shell B from escaping at the end of the latter, in which the seat $b^2$ is formed.

The great leverage afforded by the threads on the movable stem or pipe A enables a person to move the valve C with facility against the pressure of the water, and when it occupies its seat $b$ it is manifestly impossible for any water to pass into the stem A or wheel B.

The shell B may be formed with a hexagonal or other suitable polygonal portion, B', to which a wrench may be applied to insert or unscrew the shell B.

This valve or cock may be used in waterclosets, urinals, hydrants, and in any place where water-ways are opened and closed at intervals.

Having thus described my invention, what I claim as new therein, and desire to secure by Letters Patent, is—

1. The combination of the two valves C and C', operating substantially as and for the purpose herein set forth.

2. In combination with the above, the threaded hollow stem A, constructed and operating as described.

FRANCIS McGHAN.

Witnesses:
CHAS. L. DU BOIS,
R. H. MAYHEW.